Sept. 15, 1959  K. LUFT  2,903,883
DEVICES FOR MEASURING THE RELATIVE AMOUNT OF A PARAMAGNETIC
GAS IN A GASEOUS MIXTURE
Filed March 19, 1957
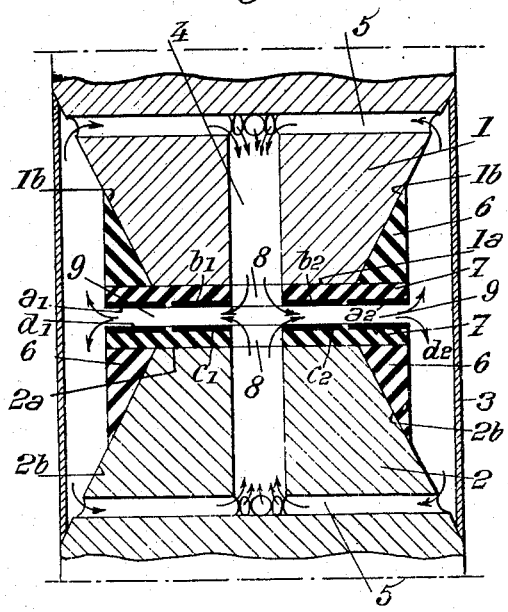
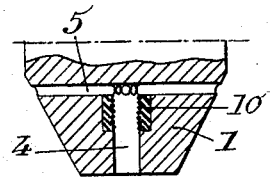
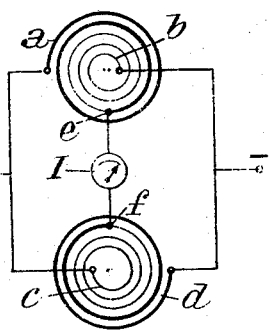
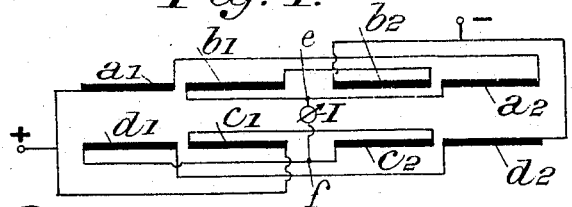
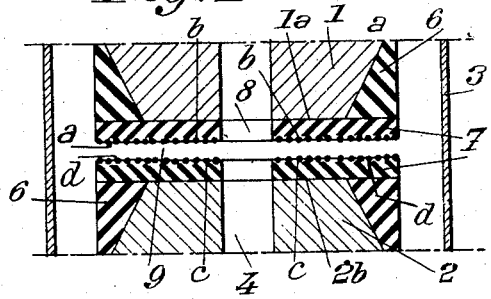
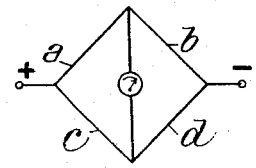
INVENTOR
Karl Luft
BY
Bailey Stephens & Huettig
ATTORNEYS United States Patent Office 2,903,883
Patented Sept. 15, 1959

2,903,883

DEVICES FOR MEASURING THE RELATIVE AMOUNT OF A PARAMAGNETIC GAS IN A GASEOUS MIXTURE

Karl Luft, Massy, France, assignor to Office National d'Etudes et de Recherches Aeronautiques, Chatillon-sous-Bagneau (Seine) France, a society of France Application March 19, 1957, Serial No. 647,069

8 Claims. (Cl. 73—27)

The present invention relates to devices for measuring the relative amount, in a gaseous mixture, of a paramagnetic gas, and in particular of oxygen.

There are already methods for utilizing the magnetic properties of paramagnetic gases, and in particular of oxygen, in order to measure the relative amount thereof in a gaseous mixture.

Among these methods, are also known those according to which measurement of the amount of paramagnetic gas is based upon measurement of the thermomagnetic convection. It should be noted that the term "thermomagnetic convection" designates the variation of temperature produced in a body when it is subjected to the action of a gaseous stream containing a paramagnetic gas, the movement of said stream being obtained by the action exerted by a non homogeneous magnetic field on said gas, the magnetic susceptibility of which is made non uniform, due to a local heating of this gas.

It is also known to use the same electric filaments as means for producing said local heating and means constituting a resistance thermometer the temperature of which is modified by the movement of the gaseous stream subjected to the non homogeneous magnetic field and including at least one paramagnetic constituent.

In order to obtain satisfactory results with this method, it is necessary to eliminate all the parasitic influences capable of modifying the result of the measurements and in particular the influence which factors other than the action of the non homogeneous field may exert upon the movement of the gaseous mixture containing one or several paramagnetic constituents.

Among these other factors may be cited, in the first place, ordinary thermal convection chimney effect, which acts in addition to thermomagnetic convection when the gaseous stream flows through a passage inclined to the horizontal. For this reason, it has been difficult and even impossible up to now to use devices for carrying out the above mentioned method when they are not fixed in position.

The chief object of the present invention is to obviate this drawback.

This invention is to be applied to devices including a magnet producing a magnetic field the non homogeneous portion of which surrounds the homogeneous portion thereof, the conduits for the gas to be examined being arranged so that said gas is first led to the homogeneous portion of said magnetic field and then is divided, under the thermomagnetic effect, into two streams of opposed directions flowing from the inside toward the outside, toward the non homogeneous zone of the magnetic field, these streams acting upon two electric filaments which act as a resistance thermometer and preferably constitute in the same time local heating means. According to the present invention these two filaments are distributed in such manner along the opposed streams, which are preferably horizontal, that one of these filaments cooperates with the inner portions of the two opposed streams and the other with the outer portions of these streams, whereby said streams of opposed directions produce a difference between the mean temperatures of the two filaments, whereas a gaseous stream flowing, under the influence of thermal convection, throughout the magnetic field, cannot produce an essential difference between the mean temperatures of the two filaments.

Preferred embodiments of my invention will hereinafter be described with reference to the accompanying drawings, given merely by way of example, and in which:

Fig. 1 diagrammatically shows, in sectional view, a first embodiment of my invention.

Fig. 2 shows a modification of the filaments serving both as local heating means and as elements of a resistance thermometer.

Fig. 3 shows on a smaller scale and in partial section a device similar to that of Fig. 1, but including supplementary means acting upon the gaseous stream.

Fig. 4 shows the connections between the filaments of Fig. 1 arranged to form a Wheatstone bridge.

Fig. 5 shows the same connections in the modification of Fig. 2.

Fig. 6 diagrammatically shows the Wheatstone bridge formed by the interconnected filaments either according to Fig. 4 or according to Fig. 5.

The device includes two pole pieces of opposed polarities the ends 1, 2 of which, disposed with a gap between them, are of frusto-conical shape and belong to a magnet capable of creating an intensive magnetic field. This field is homogeneous between the two flat surfaces 1a, 2a of the ends 1 and 2 of the pole pieces and is not homogeneous between the conical surfaces 1b, 2b. The non homogeneous portion of the field surrounds the homogeneous central portion thereof. The frusto-conical ends of the pole pieces form with a cylinder 3 an annular chamber which surrounds said ends 1 and 2 and through which flows the gaseous mixture to be analyzed. The gap between pole pieces 1 and 2 constitutes a transverse passage extending between diametrically opposite peripheral portions of the annular chamber. Through this passage flows the gaseous stream actuated by the non homogeneous portion of the magnetic field which is to cooperate with a local modification of the magnetic susceptibility of the gaseous mixture. In order to produce this local modification of the magnetic susceptibility of said mixture, I dispose in this gap electric filaments which heat the gas locally and also serve as elements of a resistance thermometer. The above described arrangement has the advantage of making measurements substantially independent of the thermal conductivity of the gaseous mixture, whereby the device can be used, among other cases, when the gaseous mixture contains hydrogen.

On the contrary, the arrangements above described do not prevent a detrimental influence of thermal convection on the results of the measurement when the apparatus is inclined. In order to eliminate this detrimental influence, the gaseous mixture is fed into the gap through one or more conduits 4 which open into the homogeneous zone of the magnetic field and preferably at the center of this zone. These conduits are advantageously provided in the pole pieces and they extend among the axis of said pieces. They communicate with the annular chamber surrounding the pole pieces through one or several radial conduits 5.

Concerning the above mentioned electric filaments, I constitute them, according to the invention, by two filaments $a$ and $b$ one of which, $b$, is disposed in the inner portion of the gap on either side of the place where conduit, or conduits, 4 open into this gap, whereas the other filament, $a$, is located in the outer portion of the gap on either side of filament $b$.

If the gaseous mixture to be examined includes a paramagnetic constituent, I obtain, under the influence of the local heating produced by filaments $a$ and $b$, a gas circulation such as indicated by the arrows of Fig. 1. In other words, a portion of the gas located in the annular chamber enters radial conduits 5 from the left and from the right, then passes through central conduit, or conduits, 4 and reaches the homogeneous portion of the magnetic field where the gaseous stream is divided into two streams which flow in opposed directions from the inside toward the outside. This movement is due to the fact that, under the action of the weakening of the non homogeneous outer portion of the magnetic field and of the local modification of the magnetic susceptibility of this gas obtained by local heating, the gas is pushed outwardly through the gap into the annular chamber that surrounds it. This circulation is the more intensive as the relative amount of paramagnetic gas in the gaseous mixture is higher. This movement of the gaseous mixture simultaneously produces a difference between the mean temperatures of filaments $a$ and $b$ which—if there were no movement of the gas—would be at the same mean temperature. The mean temperature of filament $b$ becomes lower than that of filament $a$ and the temperature difference between them depends upon the rate of movement of the two gaseous streams flowing through the gap from the center toward the periphery.

On the contrary, if, due to an inclination of the gap to the horizontal, gas, under the effect of thermal convection (chimney effect), enters the gap at one of its ends, for instance on the right hand side, so as to flow throughout the gap, such a gaseous movement would produce no modification of the mean temperatures of filaments $a$ and $b$. As a matter of fact, the temperature modification that would be produced by such a movement of the gas on the portion of filament $a$ located on the right hand end of the gap would be compensated for by the modification of temperatures of the portion of filament $a$ located at the opposite end of the gap. A similar effect would be produced for filament $b$, so that finally this gaseous flow due to an inclination of the apparatus would produce no difference between the mean temperatures of filaments $a$ and $b$.

Concerning, now, the arrangement of these filaments, it is advantageous to make use, not of one pair of filaments, but of two pairs $a$, $b$ and $c$, $d$ located along each of the pole pieces respectively. The four filaments of the two pairs may be interconnected so as to constitute the four branches of a Wheatstone bridge.

These filaments may be arranged in many different ways. On Fig. 1, each of the filaments is constituted by straight wires divided into two portions located in the gap, on either side of central conduit 4. This arrangement is applicable chiefly in the case where the flow of the gases through the gap (which has in this case a circular shape in plane view) is limited, for instance by means of radial partitions, to channels extending only along one or several diameters of the gap. If, on the contrary, the gases, after they have been led to the central portion of the gap, can flow through said gap in any radial direction whatever, it is preferable to constitute (as shown by Fig. 2) each of these filaments by a spiral surrounding conduit 4. In this case, both of the filaments $a$ and $b$ may be constituted by the same spiral separated into two portions at the point where the measurement instrument of the Wheatstone bridge is connected.

Whatever be the arrangement of the filaments which constitute both the resistance thermometers and local heating means, it is advantageous to fix them in the gap as shown by Figs. 1 and 2. Annular flanges 6 of a non magnetic material are fixed on the ends of pole pieces 1 and 2. These annular flanges support plates 7 made of an insulating material and applied against the flat surfaces $1a$ and $2a$ of the pole pieces, the free face of each of said plates 7 carrying filaments $a$, $b$ and $c$, $d$. Plates 7 are provided with holes 8 in line with conduits 4 and a space 9 is left between plates 7 for the flow of the gaseous streams under the thermomagnetic effect. These gaseous streams are therefore in direct contact with filaments $a$, $b$ and $c$, $d$.

Fig. 4 shows the Wheatstone bridge connection between the four filaments $a$, $b$, $c$ and $d$ arranged according to Fig. 1, each of these filaments being divided into two portions $a_1$, $a_2$—$b_1$, $b_2$—$c_1$, $c_2$—$d_1$, $d_2$. The indicator instrument I of the Wheatstone bridge is inserted between two conductors one of which connects the portion $a_2$ of filament $a$ with the portion $b_1$ of filament $b$, whereas the other connects the portion $c_2$ of filament $c$ with the portion $d_1$ of filament $d$.

Fig. 5 shows the lay-out of the connections in the case of Fig. 2. One of the spirals constitutes filaments $a$ and $b$ and the other filaments $c$ and $d$. Each of said spirals is divided into two portions, an outer one and an inner one, by the point (designated by $e$ for filament $a$, $b$ and by $f$ for filament $c$, $d$) where the indicator instrument I is connected.

Preferably, in the two embodiments shown by Figs. 1, 4 and 2, 5 respectively, the electric resistance of each of the filaments $a$ and $d$ which, in the case of Figs. 1, 4 includes two elementary filaments $a_1$, $a_2$ and $d_1$, $d_2$, is equal to the electric resistance of filaments $b$ and $c$ which, in the case of Figs. 1, 4, includes two elementary filaments $b_1$, $b_2$ and $c_1$, $c_2$.

Figs. 4 and 5 further show that, concerning resistances $a$ and $b$ connected in series, resistance $a$ (or $a_1$, $a_2$), that is to say the resistance on the outer side of the gap, is connected with the $+$ terminal and the resistance $b$ (or $b_1$, $b_2$) on the inner side of the gap, is connected with the $-$ terminal, whereas the reverse arrangement is applied for the resistances $d$ and $c$ connected in series. Thus, the lay-out is that indicated by Fig. 6. Such connections make my device especially sensitive. This is due to the fact that the streams flowing through the gap from its center in opposed directions cause the inner resistances $b$ and $c$ to be relatively cold, whereas the external resistances $a$ and $d$ are relatively warm. As shown by Fig. 6, owing to the above described connections, one of the two electrical filaments which are directly connected to the same terminal is always relatively cold and the other relatively warm, which produces a particularly intensive difference of voltage between the points $e$ and $f$ to which instrument I is inserted.

According to another feature of my invention, supplementary means are provided which, independently of those producing a displacement of the gaseous mixture by a thermomagnetic effect, act upon this mixture in a predetermined and preferable adjustable manner either to slow down the movement due to the thermomagnetic effect or to accelerate it. The supplementary means which act in such manner as to oppose the thermomagnetic effect chiefly permit of operating the device with an off-set zero of the measurement scale, or of operating this device according to the zero method. These supplementary means are preferably arranged so as to produce inside the pole pieces where the magnetic field is practically zero, a pressure difference of the gaseous flux, either to balance the thermomagnetic flux for the zero point of the off-set scale, or to make the thermomagnetic flux equal to zero for every measurement operation (zero method).

These supplementary means may be constituted by a heated tube 10 (Fig. 3) which produces a thermal convection stream opposed to the thermomagnetic convection stream. In order to vary the action of said supplementary means, it suffices to vary the heating of tube 10. It is true that the effect of these last mentioned means is not independent of the inclination of the apparatus, so that their utilization reduces the advantage of the main feature of the invention which consists in the fact that measurements are independent of the inclination of the apparatus.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for measuring the relative amount of a paramagnetic gas in a gaseous mixture which comprises, in combination, a magnet arranged to produce a magnetic field, said magnetic field including a central homogeneous portion and a non homogeneous portion surrounding said homogeneous portion, conduit means for feeding the gaseous mixture to be studied to the central part of said homogeneous portion of the field, means forming at least two passages in communication with said conduit means and leading, in opposed directions respectively, from said central part of said homogeneous portion of the field in outward directions through said non homogeneous portion of the field, so that said gaseous mixture fed through said conduit means is divided, by a thermomagnetic effect, into at least two streams, of opposed directions respectively, flowing outwardly through said passages, and two electric filaments arranged to act as a resistance thermometer disposed in said passages along the paths of travel of said streams, each of said filaments being constituted by two sections disposed in said two passages respectively, that is to say on opposit sides of said central part of the magnetic field respectively, one of said filaments extending along the inner portions of said passages and the other filament along the outer portions of said passages.

2. A device according to claim 1 in which said electric filaments along which said gaseous streams of opposed directions are flowing are horizontally disposed.

3. A device for measuring the relative amount of a paramagnetic gas in a gaseous mixture which comprises, in combination, a magnet having two pole pieces of opposed polarities, said two pole pieces being of frustoconical shape and coaxially disposed opposite each other with their respective portions of smaller diameter adjacent to each other so as to leave a gap between them, whereby said magnet produces a magnetic field including a homogeneous portion in said gap and a nonhomogeneous portion around said gap, said two pole pieces being surrounded by a casing so as to form a chamber around said pole pieces, at least one of said pole pieces being provided with an axial conduit one end of which opens into the central portion of said gap, said pole piece being provided with at least one radial conduit connecting the other end of said axial conduit with said annular chamber, so that the gaseous mixture to be analyzed, which is present in said annular chamber, enters said axial conduit through said radial conduit and, at the outlet of said axial conduit into said gap, is divided by a thermomagnetic effect, into at least two streams, of opposed directions respectively, flowing toward said nonhomogeneous portion of the field, and two electric filaments arranged to act as a resistance thermometer disposed in said gap along the paths of travel of said streams therein, each of said filaments being constituted by two sections disposed respectively on either side of the outlet of said axial conduit into said gap, one of said filaments extending along the inner portion of said gap and the other filament along the outer portion of said gap.

4. A device according to claim 3 in which the sections of each of said filaments are disposed on one of the walls of said gap on either side of the outlet of said axial conduit into said gap, the two filament sections on one side of said outlet being disposed in line with each other.

5. A device according to claim 3 in which said filaments are disposed along a spiral which is around the outlet of said axial conduit into said gap.

6. A device according to claim 3 including two filaments on each face of said gap, said four filaments being connected to form a Wheatstone bridge, the device further including a source of current and the filaments being arranged so that, for the two filaments located on one face of said gap, the one having its sections located in the inner zone of the magnetic field is connected with one of the terminals of the source whereas the other one, which has its sections located in the outer zone of the magnetic field, is connected with the other terminal of the source, the connections between the two filaments located on the other face of said gap and the terminals of the source being inversely disposed with respect to those above stated.

7. A device according to claim 3 including on each face of the gap two filaments constituted by a single spiral, the inner spires of which constitute one of the filaments and the outer spires of which constitute the other filament, the four filaments being connected to form a Wheatstone bridge, and an indicator instrument inserted between the points where the two filaments of each spiral are connected to each other.

8. A device according to claim 3 further including heating means on said axial conduit for influencing the flow of the gaseous streams therethrough.

References Cited in the file of this patent

UNITED STATES PATENTS

| | | |
|---|---|---|
| 2,603,964 | Foley et al. | July 22, 1952 |
| 2,693,103 | Krupp | Nov. 2, 1954 |

FOREIGN PATENTS

| | | |
|---|---|---|
| 944,035 | Germany | June 7, 1956 |
| 944,901 | Germany | June 28, 1956 |